United States Patent
Qi et al.

(10) Patent No.: US 10,153,912 B2
(45) Date of Patent: Dec. 11, 2018

(54) METHOD AND SYSTEM FOR OPTIMIZING INFORMATION PUSHING TIME ACCORDING TO ALARM CLOCK

(71) Applicant: HUIZHOU TCL MOBILE COMMUNICATION CO., LTD., Hui Zhou (CN)

(72) Inventors: Dongjing Qi, Hui Zhou (CN); Guokuan Fang, Hui Zhou (CN)

(73) Assignee: HUIZHOU TCL MOBILE COMMUNICATION CO., LTD., Huizhou (CN)

( * ) Notice: Subject to any disclaimer, the term of this patent is extended or adjusted under 35 U.S.C. 154(b) by 0 days.

(21) Appl. No.: 15/566,403

(22) PCT Filed: Oct. 25, 2016

(86) PCT No.: PCT/CN2016/103169
§ 371 (c)(1),
(2) Date: Oct. 13, 2017

(87) PCT Pub. No.: WO2017/143795
PCT Pub. Date: Aug. 31, 2017

(65) Prior Publication Data
US 2018/0123817 A1    May 3, 2018

(30) Foreign Application Priority Data
Feb. 26, 2016    (CN) .................. 2016 1 01064226

(51) Int. Cl.
*H04L 12/18*    (2006.01)
*H04L 29/08*    (2006.01)
*H04M 19/04*    (2006.01)
*H04W 72/04*    (2009.01)
*H04M 1/725*    (2006.01)

(52) U.S. Cl.
CPC .......... *H04L 12/1859* (2013.01); *H04L 67/26* (2013.01); *H04M 1/72566* (2013.01); *H04M 19/045* (2013.01); *H04W 72/048* (2013.01)

(58) Field of Classification Search
CPC .. H04L 12/1859; H04L 67/26; H04W 72/048; H04M 19/045
See application file for complete search history.

(56) References Cited

U.S. PATENT DOCUMENTS

| | | | | |
|---|---|---|---|---|
| 6,928,300 | B1 * | 8/2005 | Skinner | G06F 1/1626 340/4.5 |
| 8,948,821 | B2 * | 2/2015 | Newham | H04M 19/04 455/412.2 |
| 2004/0198427 | A1 * | 10/2004 | Kimbell | H04M 1/663 455/556.1 |

(Continued)

*Primary Examiner* — Nathan Mitchell
(74) *Attorney, Agent, or Firm* — Shimokaji IP

(57) ABSTRACT

The present invention discloses a method and a system for optimizing information pushing time according to an alarm time, comprising: presetting an alarm time on a smart terminal; according to the set alarm time, and by recording whether a user uses the smart terminal before and after the alarm time for a period, summarizing a regular work/rest time of the user; within said regular work/rest time, shutting down an information pushing function; when the alarm is triggered, turning on the information pushing function again.

15 Claims, 3 Drawing Sheets

(56) References Cited

U.S. PATENT DOCUMENTS

| | | | |
|---|---|---|---|
| 2006/0019638 A1* | 1/2006 | Chiu | G06Q 10/109 455/412.2 |
| 2009/0264116 A1* | 10/2009 | Thompson | H04M 3/436 455/418 |
| 2010/0332602 A1* | 12/2010 | O'Sullivan | G06Q 10/107 709/206 |
| 2012/0295645 A1* | 11/2012 | Yariv | H04L 67/322 455/466 |
| 2013/0332721 A1* | 12/2013 | Chaudhri | G06F 3/016 713/100 |
| 2014/0006769 A1* | 1/2014 | Chory | G06F 1/3203 713/100 |
| 2014/0189015 A1* | 7/2014 | Chan | G06Q 10/107 709/204 |
| 2015/0262132 A1* | 9/2015 | Miller | G06Q 10/1097 705/7.15 |

* cited by examiner

METHOD AND SYSTEM FOR OPTIMIZING INFORMATION PUSHING TIME ACCORDING TO ALARM CLOCK

TECHNICAL FIELD

The present invention relates to the field of smart terminal technologies, and in particular to a method and a system for optimizing information pushing time according to an alarm time.

BACKGROUND

Along with the quick development and widespread use of smart terminals, more and more users use the alarm function in smart terminals, such as smartphones and tablet computers, to manage their work/rest time. As cell phone configurations are upgraded, more and more apps are installed, leading to an increasingly high quantity of pushed messages, particularly when a user rests or works, the continuous pushing of advertisement or information results in tremendous disturbance to the user.

Therefore, the prior art needs to be improved.

SUMMARY

In an embodiment, a method and a system for optimizing information pushing time according to an alarm time is provided. The present invention is applied on smart terminals, such as smartphones, tablet computers, etc., which, according to an alarm time set by a user, shields the information pushing function before the alarm is triggered and during the user's break or work time, turns on the information pushing function after the alarm is triggered, optimizes the pushing time, prevents disturbance to the user, and provides convenience for the user.

In an embodiment, a method for optimizing information pushing time according to an alarm time is provided, comprising:

presetting a wake-up alarm on a smart terminal;

according to the set wake-up alarm, recording the time information regarding a user's use of the smart terminal before the wake-up alarm for a predetermined period, so as to summarize the regular work/rest time of the user;

within said regular work/rest time, shutting down the information pushing function in the background; when the wake-up alarm is triggered, turning on the information pushing function again.

In a further embodiment, the according to the set wake-up alarm, recording the time information regarding a user's use of the smart terminal before the wake-up alarm for a predetermined period, so as to summarize the regular work/rest time of the user comprises:

according to the set wake-up alarm, recording the time point at which the user uses the smart terminal before the wake-up alarm and the use duration every day for a predetermined period, so as to summarize the regular work/rest time of the user.

In a further embodiment, the according to the set wake-up alarm, recording the time information regarding a user's use of the smart terminal before the wake-up alarm for a predetermined period, so as to summarize the regular work/rest time of the user comprises:

according to the set wake-up alarm, recording the time point at which the user uses the smart terminal before the wake-up alarm and the use duration every day for a week, so as to summarize the regular work/rest time of the user.

In a further embodiment, the according to the set wake-up alarm, recording the time information regarding a user's use of the smart terminal before the wake-up alarm for a predetermined period, so as to summarize the regular work/rest time of the user comprises:

according to the set wake-up alarm, recording the wake-up alarm and summarizing the alarm triggering for the predetermined period;

calculating how long the user does not use before the alarm is triggered every day for the predetermined period, and recording the time length T during which the smart terminal is not used;

according to the time length T during which the smart terminal is not used every day for the predetermined period, calculating an average or effective value or median, summarizing the regular work/rest time Tc of the user, and determining that the user rests or handles other regular matters at the work/rest time Tc.

In a further embodiment, the according to the set wake-up alarm, recording the wake-up alarm and summarizing the alarm triggering for the predetermined period, so as to summarize the regular work/rest time of the user further comprises:

If the set wake-up alarm changes, using the currently changed wake-up alarm as a start point, continuing to record the changed wake-up alarm and summarize the alarm triggering for the predetermined period, so as to summarize the regular work/rest time of the user.

In a further embodiment, the calculating how long the user does not use before the alarm is triggered every day for the predetermined period, and recording the time length T during which the smart terminal is not used comprises:

calculating how long the user does not use the smart terminal before the alarm is triggered every day for the predetermined period, or every time when the time of using the smart terminal is shorter than a first predetermined time, then continuing to judge it as no use of the smart terminal, and recording the time length T during which the smart terminal is not used.

In another embodiment, a method for optimizing information pushing time according to an alarm time is provided, comprising:

presetting an alarm time on a smart terminal;

according to the set alarm time, and by recording the period time regarding whether a user uses the smart terminal before and after the alarm time, the smart terminal summarizes the regular work/rest time of the user;

within said regular work/rest time, the smart terminal controls to shut down the information pushing function in the background; when the alarm is triggered, turns on the information pushing function again.

In a further embodiment, at the same time as the presetting an alarm time on a smart terminal, the method further comprises:

The smart terminal receives an operation command from the user to set a wake-up alarm.

In a further embodiment, the according to the set alarm time, and by recording the period time regarding whether a user uses the smart terminal before and after the alarm time, the smart terminal summarizes the regular work/rest time of the user comprises:

The smart terminal receives an alarm time set by the user, the background records said alarm time and summarizes the alarm triggering for a predetermined period, so as to summarize the regular work/rest time of the user;

The background of the smart terminal calculates how long the user does not use the smart terminal before the alarm is triggered every day, records the time length T during which the smart terminal is not used, and summarizes said predetermined period;

According to the time length T during which the smart terminal is not used every day for the predetermined period, calculating an average or effective value or median, summarizing the regular work/rest time Tc of the user, and determining that the user rests or handles other regular matters during said period of time.

In a further embodiment, the method for optimizing information pushing time according to an alarm time, wherein, the smart terminal receives an alarm time set by the user, the background records said alarm time and summarizes the alarm triggering for a predetermined period, so as to summarize the regular work/rest time of the user further comprises:

If the set alarm time changes, using the currently latest alarm as a start point, continuing to record the alarm time and summarize the alarm triggering for the predetermined period, so as to summarize the regular work/rest time of the user.

In a further embodiment, the background of the smart terminal calculates how long the user does not use before the alarm is triggered every day, records the time length T during which the smart terminal is not used, and summarizes said predetermined period comprises:

the background of the smart terminal calculates how long the user does not use the smart terminal before the alarm is triggered every day, or every time when the time of using the smart terminal is shorter than a first predetermined time, then continues to judge it as no use of the smart terminal, records the time length T during which the smart terminal is not used, and summarizes said predetermined period.

In a further embodiment, the smart terminal is a smartphone or a tablet computer.

In a further embodiment, said predetermined period is 7 days.

In another embodiment, a system for optimizing information pushing time according to an alarm time is provided, comprising:

A presetting module, configured to preset an alarm time on a smart terminal;

A work/rest time summarizing module, configured to control the smart terminal to, according to the set alarm time, and by recording the period time regarding whether a user uses the smart terminal before and after the alarm time, summarize the regular work/rest time of the user;

A message pushing module, configured to control the smart terminal to, within said regular work/rest time, shut down the information pushing function in the background; when the alarm is triggered, turn on the information pushing function again.

In a further embodiment, the system for optimizing information pushing time according to an alarm time further comprises:

A receiving module, configured for the smart terminal to receive an operation command from the user to set a wake-up alarm.

In a further embodiment, the work/rest time summarizing module comprises:

A recording unit, configured to control the smart terminal to receive an alarm time set by the user, the background records said alarm time and summarizes the alarm triggering for a predetermined period, so as to summarize the regular work/rest time of the user;

A calculating unit, configured to control the background of the smart terminal to calculate how long the user does not use the smart terminal before the alarm is triggered every day, record the time length T during which the smart terminal is not used, and summarize said predetermined period;

A first determining unit, configured to, according to the time length T during which the smart terminal is not used every day for the predetermined period, calculate an average or effective value or median, summarize the regular work/rest time Tc of the user, and determine that the user rests or handles other regular matters during said period of time.

In a further embodiment, the work/rest time summarizing module further comprises:

A changing unit, configured to, if the set alarm time changes, use the currently latest alarm as a start point, continue to record the alarm time and summarize the alarm triggering for the predetermined period, so as to summarize the regular work/rest time of the user.

In a further embodiment, the work/rest time summarizing module further comprises:

A second determining unit, configured to control the background of the smart terminal to calculate how long the user does not use the smart terminal before the alarm is triggered every day, or every time when the time of using the smart terminal is shorter than a first predetermined time, then continue to judge it as no use of the smart terminal, record the time length T during which the smart terminal is not used, and summarize said predetermined period. Preferably, said predetermined period is 7 days.

In a further embodiment, the smart terminal is a smartphone or a tablet computer.

By recording the alarm triggering for a period, the present invention summarizes the regular work/rest time of the user, and controls the smart terminal to shut down the information pushing function in the summarized work/rest time, such that the smart terminal has the function of automatic optimization of information pushing time. The application of the present invention can, according to an alarm time set by a user, shield the information pushing function before the alarm is triggered and during the user's break or work time, turn on the information pushing function after the alarm is triggered, optimize the pushing time, prevent disturbance to the user during the user's break or work time, and provide convenience for the user.

DETAILED DESCRIPTION

To make the objects, technical solutions and advantages of the present invention clearer and more specific, the present invention will be further described in detail below with reference to the accompanying drawings and embodiments. It should be understood that the specific embodiments described herein are only used to explain the present invention, not used to limit the present invention.

Figure 1:
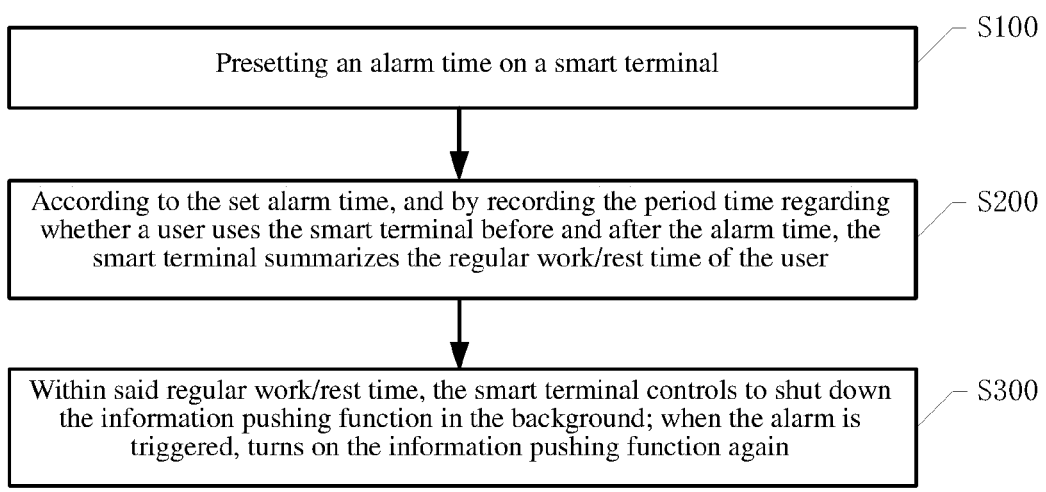
FIG. 1 depicts a flow chart of the method for optimizing information pushing time according to an alarm time according to an exemplary embodiment of the present invention.

Please refer to FIG. 1, and FIG. 1 depicts a flow chart of the method for optimizing information pushing time according to an alarm time according to an exemplary embodiment of the present invention, said method comprising:

Presetting an alarm time on a smart terminal. (Block S100)

In daily life, a smart terminal is typically installed with many applications, and there are numerous information or advertisements pushed by all the applications. Although regular applications have a setting to shut down message push, an application's information pushing function will be turned on when a user needs to learn relevant news promptly or other messages. During rest or work time of a user, however, various message pushing will cause disturbance to the user. In specific implementations of the present invention, the alarm time set by a user is combined with the on and off of the information pushing function to optimize information pushing time, thereby avoiding disturbance to the user by information pushing during rest or work time of the user.

The smart terminal may be a smartphone or a tablet computer; in the present invention, a smartphone is used as an example for description. During specific implementations, a user may preset an alarm time on the smart terminal as need; preferably, a wake-up alarm and a sleep alarm may be set; for example, the smartphone receives an operation command from the user to set a wake-up alarm at 7 am. Then, when the cell phone has the alarm function turned on, the alarm will be automatically triggered at the set time, 7 am, to remind the user to get up or go to sleep.

According to the set alarm time, and by recording the period time regarding whether a user uses the smart terminal before and after the alarm time, the smart terminal summarizes the regular work/rest time of the user. (Block S200)

In specific implementations of the present invention, according to the set alarm time, and by recording the period time regarding whether a user uses the smart terminal before and after the alarm time, the smart terminal summarizes the regular work/rest time of the user; specifically, the smart terminal records the time information, such as cell phone use time point and use duration, regarding the user uses the cell phone before and after the alarm time for a preset period, and consequently summarizes the regular work/rest time of the user. In specific implementations of the present invention, said predetermined period may be 7 days, when the cell phone is used in daily life, when the user sets an alarm, the cell phone will record the use of the cell phone by the user before and after 7 am every day during the 7-day period, for example, the wake-up alarm is set to be 7:00 am, if it is recorded that the period from 12:00 am to 7:00 am is a time that the user does not use the cell phone frequently, it is deemed as a regular work/rest time of the user.

In specific implementations of the present invention, the block S200 comprises:

The smart terminal receives the alarm time set by the user, the background records said alarm time and summarizes the alarm triggering for a predetermined period, so as to summarize the regular work/rest time of the user. For example, when the user sets a wake-up alarm on the cell phone, the background automatically records the wake-up alarm triggering information every day within one week, which is used to summarize the regular work/rest time of the user. (Block S201)

Furthermore, if the set alarm time changes, the currently latest alarm is used as a start point, to continue to record the alarm time and summarize the alarm triggering for a predetermined period, so as to summarize the regular work/rest time of the user. For example, when the user adjusts the wake-up alarm from 7 am to 6:30 am, the smartphone will record the alarm triggering after the adjustment within one week, and the duration that the cell phone is not used before 6:30 am every day within one week after the alarm adjustment, so as to summarize the regular work/rest time of the user.

The background of the smart terminal calculates how long the user does not use the smart terminal before the alarm is triggered every day, records the time length T during which the smart terminal is not used, and summarizes said predetermined period. For example, the cell phone records the duration in which the user does not use the cell phone before the wake-up alarm is triggered every day within one week, and the duration in which the user does not use the cell phone before the alarm is triggered within one week is T1, T2, T3, T4, T5, T6, and T7, respectively, the first record shows that the period during which the user does not use the cell phone before the wake-up alarm at 7:00 is from 11 pm of the night before to 7 am of the next day, then the duration T1 of no use of the cell phone is 8 hours. (Block S202)

Furthermore, the background of the smart terminal calculates how long the user does not use the cell phone before the alarm is triggered every day, or every time when the time of using the cell phone is shorter than a first predetermined time, then continues to judge it as no use of the cell phone, records the time length T during which the smart terminal is not used, and summarizes said predetermined period. In specific implementations of the present invention, said first predetermined time is 30 s, i.e. if the background of the smart terminal calculates that the time of using the cell phone by the user is shorter than 30 s every time every day, then said time of using the cell phone is still judged to be no use of the cell phone. If the user operates to open a newly arrived message at 1 am and instantly turns off the cell phone after reading the message, the process of cell phone use does not exceed 30 s, then the cell phone still determines this use as no use in the record by the background.

According to the time length T during which the smart terminal is not used every day for the predetermined period, calculating an average or effective value or median, summarizing the regular work/rest time Tc of the user, and determining that the user may rest or handle other regular matters during said period of time. For example, according to the duration in which the user does not use the cell phone before the alarm is triggered within one week obtained in the step S202: T1, T2, T3, T4, T5, T6, and T7, an average or effective value or median may be calculated for these data and used as the regular work/rest time of the user, and the user may rest or handle other regular matters during said period of time. If there are 3 8 hours, 3 7 hours, and 1 7.5 hours among T1 to T7, then the calculated average of 7.5 hours can be used as the rest time of the user before the wake-up alarm. (Block S203)

Within said regular work/rest time, the smart terminal controls to shut down the information pushing function in the background; when the alarm is triggered, turns on the information pushing function again. (Block S300)

For example, if the smartphone calculates and obtains that the work/rest time of the user is 7.5 hours, the cell phone background controls to shut down the information pushing function within 7.5 hours before the wake-up alarm at 7 am, to prevent automatic message pushing by applications within the work/rest time of the user from disrupting the user's rest; when the alarm is triggered, namely the wake-up alarm sets off at 7 am according to the present invention, the background turns on the information pushing function. In such a way, the user will not miss any important pushed information, nor will the user be disturbed by numerous pushed messages during the rest time.

Figure 2:
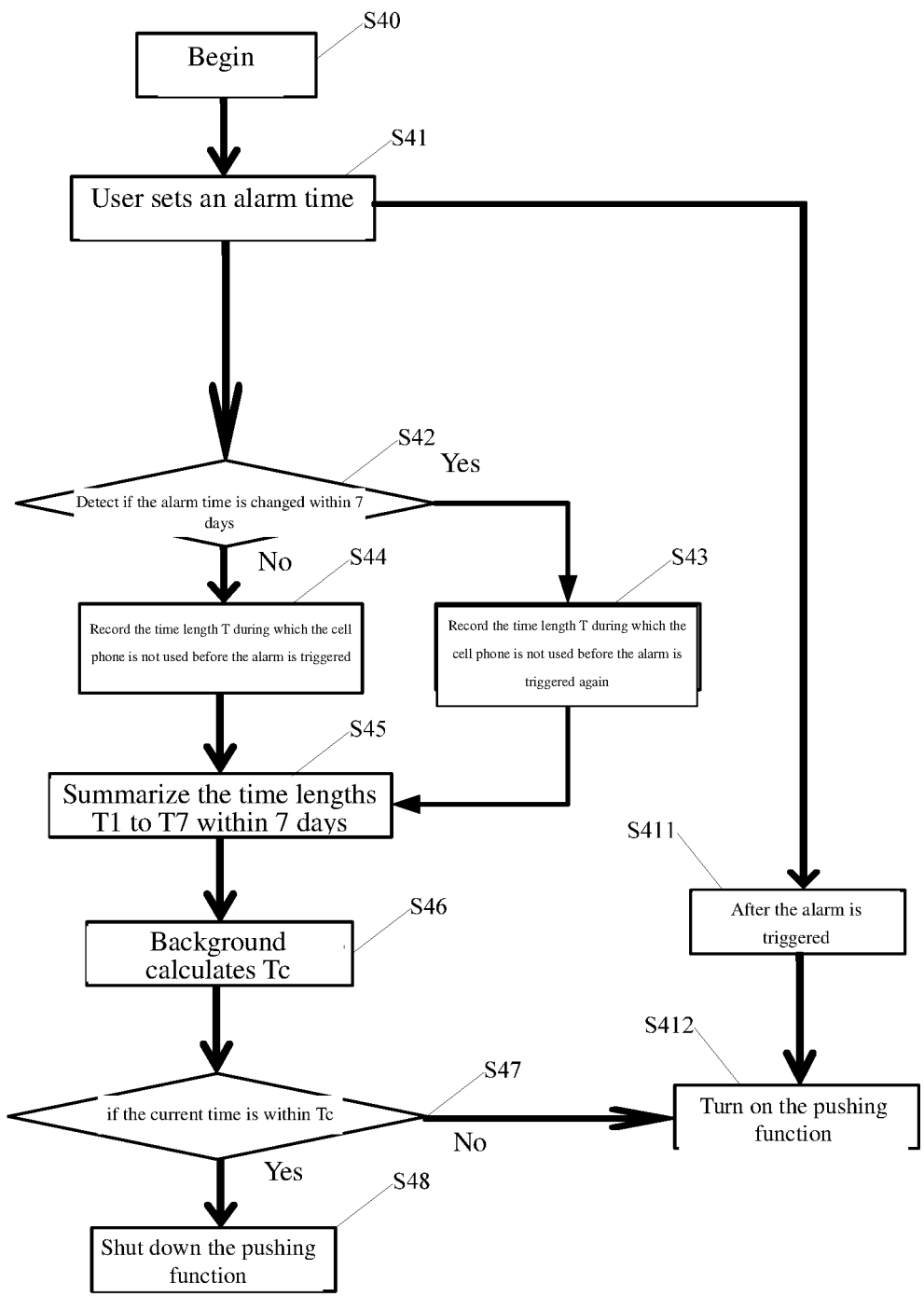
FIG. 2 is a flow chart of the method for optimizing information pushing time according to an alarm time according to an exemplary embodiment of the present invention.

According to the method embodiment above, the present invention further provides a processing flow of the method for optimizing information pushing time according to an alarm time according to an exemplary embodiment, as shown in FIG. 2, comprising:

begin, the smartphone is on; (Block S40)

the smartphone receives an operation command from the user to set an alarm time; (Block S41)

when the alarm is triggered, ring and go to next block S412; (Block S411)

the information pushing function is turned on, for example, after the wake-up alarm is set off, the information pushing function of the smartphone is activated, and messages pushed by applications can be received; (Block S412)

after the user sets an alarm, the background of the smartphone summarizes the alarm rule within 7 days, records in real time the alarm triggering every day, determines if the alarm time is changed within the 7 days, if yes, go to block S43, if no, go to the block S44; (Block S42)

use the newly set alarm time as a start point, record the time length T during which the smartphone is not used before the alarm is triggered within 7 days again; (Block S43)

record the time length T during which the smartphone is not used before the alarm is triggered within 7 days; (Block S44)

summarize to obtain the time lengths T1 to T7 during which the smartphone is not used before the alarm is triggered within 7 days; (Block S45)

according to the time lengths T1 to T7 obtained in S45, calculate an average or effective value or median of these data, which is used as the regular work/rest time Tc of the user, and go to the next block; (Block S46)

determine if the current time of the smartphone is within the work/rest time Tc before the alarm is triggered, if yes, go to block S48, shut down the information pushing function; if no, go to block S412, the smartphone turns on the information pushing function. (Block S47)

the current time of the smartphone is within the work/rest time Tc before the alarm is triggered, the smartphone shuts down the information pushing function. (Block S48)

The embodiments of the present invention associate and combine the alarm time set by a user with the on and off of the information pushing function to optimize information pushing time, thereby avoiding disturbance to the user by information pushing during rest or work time of the user, which is significantly convenient for the user.

Figure 3:
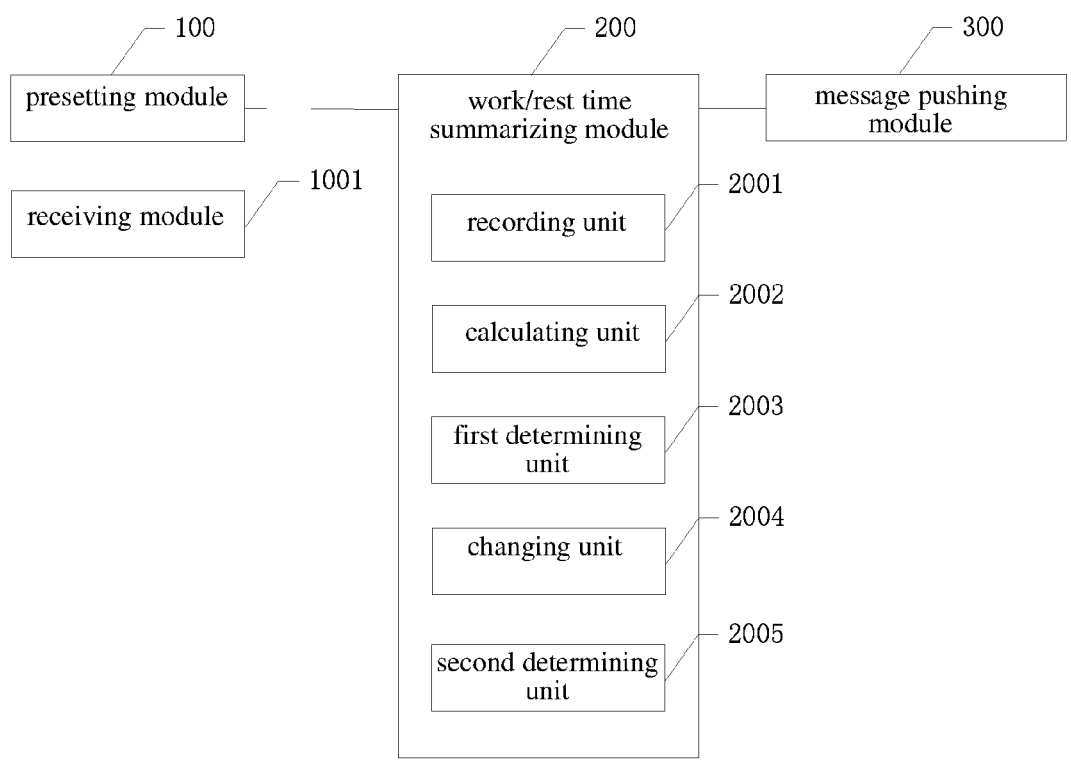
FIG. 3 is a block diagram of the principle of the system for optimizing information pushing time according to an alarm time according to an exemplary embodiment of the present invention.

Corresponding to the method embodiment above, the present invention further provides is a system for optimizing information pushing time according to an alarm time, as shown in FIG. 3, FIG. 3 is a block diagram of the principle of the system for optimizing information pushing time according to an alarm time according to an exemplary embodiment of the present invention, said system comprising:

A presetting module 100, configured to preset an alarm time on a smart terminal; as described specifically above.

A work/rest time summarizing module 200, configured to control the smart terminal to, according to the set alarm time, and by recording the period time regarding whether a user uses the smart terminal before and after the alarm time, summarize the regular work/rest time of the user; as described specifically above.

A message pushing module 300, configured to control the smart terminal to, within said regular work/rest time, shut down the information pushing function in the background; when the alarm is triggered, turn on the information pushing function again; as described specifically above.

Furthermore, the system for optimizing information pushing time according to an alarm time further comprises:

A receiving module 1001, configured for the smart terminal to receive an operation command from the user to set a wake-up alarm; as described specifically above.

Furthermore, in the system according to the present invention, the smart terminal is a smartphone or a tablet computer; said predetermined period is 7 days.

Furthermore, the system for optimizing information pushing time according to an alarm time, wherein the work/rest time summarizing module 200 comprises:

A recording unit 2001, configured to control the smart terminal to receive an alarm time set by the user, the background records said alarm time and summarizes the alarm triggering for a predetermined period, so as to summarize the regular work/rest time of the user; as described specifically above.

A calculating unit 2002, configured to control the background of the smart terminal to calculate how long the user does not use the smart terminal before the alarm is triggered every day, record the time length T during which the smart terminal is not used, and summarize said predetermined period; as described specifically above.

A first determining unit 2003, configured to, according to the time length T during which the smart terminal is not used every day for the predetermined period, calculate an average or effective value or median, summarize the regular work/rest time Tc of the user, and determine that the user rests or handles other regular matters during said period of time; as described specifically above.

A changing unit 2004, configured to, if the set alarm time changes, use the currently latest alarm as a start point, continue to record the alarm time and summarize the alarm triggering for the predetermined period, so as to summarize the regular work/rest time of the user; as described specifically above.

A second determining unit 2005, configured to control the background of the smart terminal to calculate how long the user does not use the smart terminal before the alarm is triggered every day, or every time when the time of using the smart terminal is shorter than a first predetermined time, then continue to judge it as no use of the smart terminal, record the time length T during which the smart terminal is not used, and summarize said predetermined period; as described specifically above. In summary, by recording the alarm triggering for a period, the method and the system for optimizing information pushing time according to an alarm time according to the present invention summarize the regular work/rest time of the user, and control the smart terminal to shut down the information pushing function in the summarized work/rest time, such that the smart terminal has the function of automatic optimization of information pushing time. The application of the present invention can, according to an alarm time set by a user, shield the information pushing function before the alarm is triggered and during the user's break or work time, turn on the information pushing function after the alarm is triggered, optimize the pushing time, prevent disturbance to the user by information pushing during the user's break or work time, and provide convenience for the user.

Naturally, a person skilled in the art should understand that all or some flows in the methods in the embodiments above may be implemented by using a computer program to instruct relevant hardware (e.g. processors, controllers, etc.), the program may be stored in a computer readable memory medium, and during execution, the program may comprise the flows set forth in the above method embodiments. Wherein, the memory medium may be a memory, a magnetic disk or an optical disk.

It should be understood that applications of the present invention are not limited by the above examples. To a person skilled in the art, improvements or modification may be made according to the above description, and all these improvements and modifications shall be encompassed in the scope of the claims appended to the present invention.

The invention claimed is:

1. A method for optimizing information pushing time according to an alarm time, the method comprising:
   presetting, via user of a smart terminal, the alarm time of the smart terminal;
   recording, via the smart terminal, information regarding use of the smart terminal during a first predetermined time period before the alarm time, wherein the first predetermined time period is recorded for a predetermined number of days;
   calculating, via the smart terminal, a length of time during the predetermined time period that the smart terminal is not in use based on the information regarding use of the smart terminal;
   calculating, via the smart terminal, a median time period that the smart terminal is not in use based on the calculated lengths of time; and
   deactivating, via the smart terminal, an information pushing function of the smart terminal during the median time period before the alarm time.

2. The method for optimizing information pushing time according to an alarm time according to claim 1, wherein the predetermined number of days is seven days.

3. The method for optimizing information pushing time according to an alarm time according to claim 1, wherein the recording the information regarding use of the smart terminal during the first predetermined time period further comprises:
   changing the alarm time to a second different alarm time; and
   recording, via the smart terminal, information regarding use of the smart terminal during the first predetermined time before the second different alarm time.

4. The method for optimizing information pushing time according to an alarm time according to claim 1, wherein the calculating a length of time during the predetermined time period that the smart terminal is not in use further comprises:
   judging that the smart terminal is not in use based on a usage time of the smart terminal being less than a first determined time.

5. A method for optimizing information pushing time according to an alarm time, comprising:
   presetting, via a user, the alarm time on a smart terminal;
   summarizing, via the smart terminal and for a predetermined periodic time period, first information regarding a rest time associated with the user by recording, via the smart terminal, information about use of the smart terminal during a first time period before the alarm time;
   calculating, via the smart terminal, and based on the summarizing the first information recorded over the predetermined periodic time period, lengths of time during the first time period that the smart terminal is not in use;
   calculating, via the smart terminal, a median time period that the smart terminal is not in use based on the calculated lengths of time; and
   deactivating, via the smart terminal, an information pushing function of the smart terminal during the median time period before the alarm time.

6. The method for optimizing information pushing time according to an alarm time according to claim 5, wherein the summarizing the first information further comprises:
   changing the alarm time to a second different alarm time; and
   summarizing, via the smart terminal and for the predetermined periodic time period, the first information regarding a rest time associated with the user by recording, via the smart terminal, information about use of the smart terminal during the first time period before the second different alarm time.

7. The method for optimizing information pushing time according to an alarm time according to claim 5, wherein the calculating the lengths of time that the smart terminal is not in use further comprises:
   judging that the smart terminal is not in use based on a usage time of the smart terminal being less than a first determined time.

8. The method for optimizing information pushing time according to an alarm time according to claim 5, wherein the predetermined periodic time is seven days.

9. The method for optimizing information pushing time according to an alarm time according to claim 5, wherein said smart terminal is a smartphone or a tablet computer.

10. A smart terminal comprising:
    at least one processor; and
    a memory storing at least one instruction that when executed by the at least one processor causes the at least one processor to:
       record information regarding use of the smart terminal during a first predetermined time period before a set alarm time of the smart terminal, wherein the first predetermined time period is recorded for a predetermined number of days;
       calculate a length of time during the predetermined time period that the smart terminal is not in use based on the information regarding use of the smart terminal;
       calculate a median time period that the smart terminal is not in use based on the calculated lengths of time; and
       deactivate an information pushing function of the smart terminal during the median time period before the alarm time.

11. The system for optimizing information pushing time according to an alarm time according to claim 10, wherein the memory further stores at least one instruction that when executed by the at least one processor causes the at least one processor:
    control the smart terminal to receive an operation command from the user to set the alarm time.

12. The system for optimizing information pushing time according to an alarm time according to claim 10, wherein the memory further stores at least one instruction that when executed by the at least one processor causes the at least one processor:
    change the alarm time to a second different alarm time; and
    record information regarding use of the smart terminal during the first predetermined time before the second different alarm time.

13. The system for optimizing information pushing time according to an alarm time according to claim 10, wherein the memory further stores at least one instruction that when executed by the at least one processor causes the at least one processor:
    judge that the smart terminal is not in use based on a usage time of the smart terminal being less than a first determined time.

14. The system for optimizing information pushing time according to an alarm time according to claim 10, wherein the predetermined number of days is seven days.

15. The system for optimizing information pushing time according to an alarm time according to claim 10, wherein the smart terminal is a smartphone or a tablet computer.

\* \* \* \* \*